Patented Aug. 22, 1933

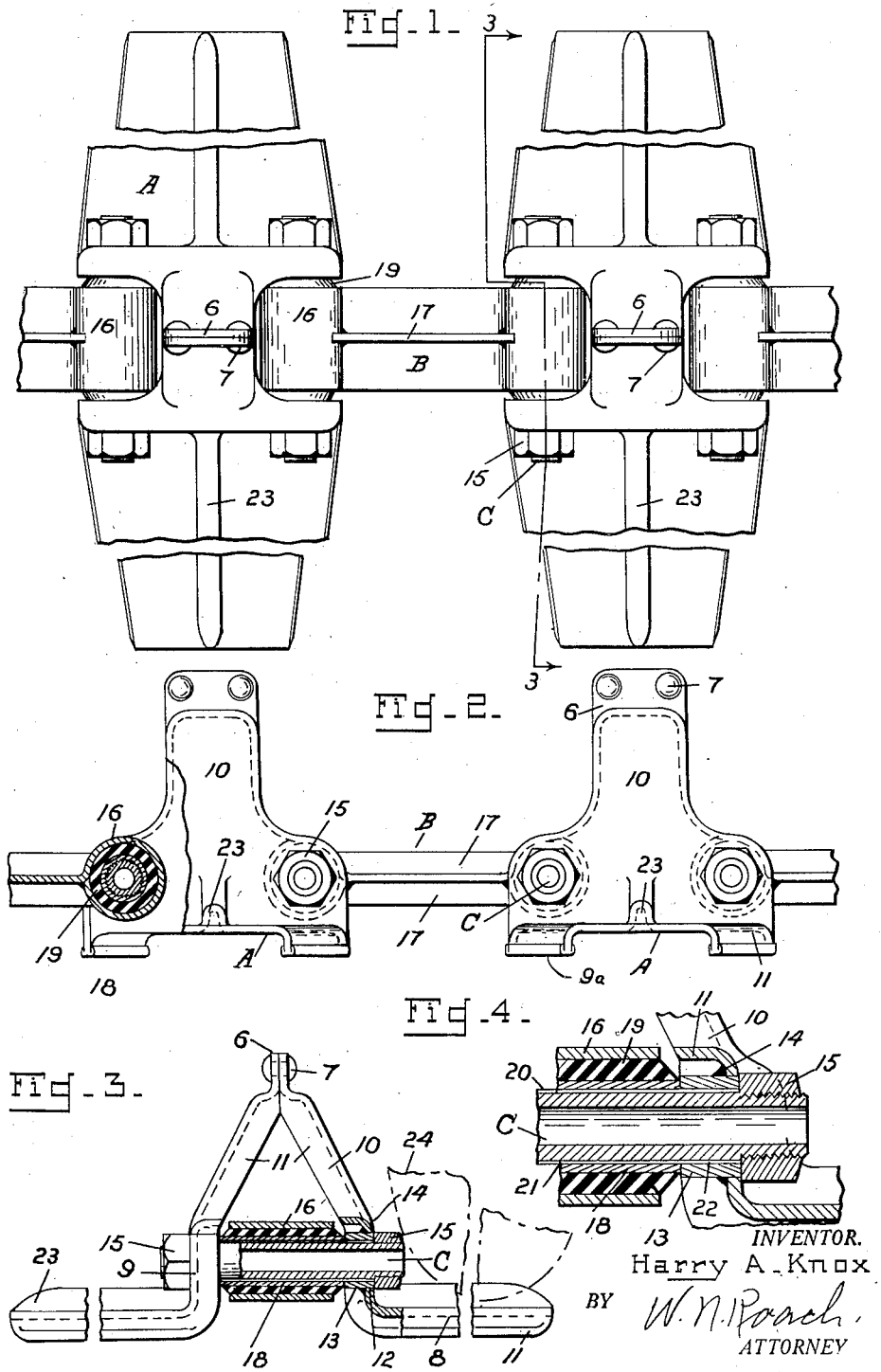

1,923,099

UNITED STATES PATENT OFFICE 1,923,099

TRACK FOR TRACK-LAYING VEHICLES

Harry A. Knox, Davenport, Iowa

Application February 6, 1933. Serial No. 655,445

6 Claims. (Cl. 305—10)

(Granted under the Act of March 3, 1883, as amended April 30, 1928; 370 O. G. 757)

The invention described herein may be manufactured and used by or for the Government for governmental purposes, without the payment to me of any royalty thereon.

This invention relates to a track for track-laying vehicles.

The purpose of the present invention is to provide a track of light weight in which the shoes are conveniently formed of two similar plates connected by link pins.

A further object of the invention is to provide a rubber jointed track in which the bushing is utilized to reinforce and strengthen the shoes.

To these and other ends, the invention consists in the construction, arrangement and combination of elements described hereinafter and pointed out in the claims forming a part of this specification.

A practical embodiment of the invention is illustrated in the accompanying drawing, wherein:

Fig. 1 is a plan view of a portion of the lower flight of a track constructed in accordance with the invention.

Fig. 2 is a view partly in side elevation and partly in section and,

Fig. 3 is a sectional view taken on the line 3—3 of Fig. 1.

Fig. 4 is an enlarged sectional view of a portion of Fig. 3.

The track comprises a series of shoes A connected in spaced relation by links B mounted on link pins C.

The shoes are all identical and each one consists of two similar plates (Fig. 3) having their adjoining extremities 6—6 secured by rivets 7. The plates each include a horizontal ground-engaging portion 8, a vertically bent portion 9 and an inclined portion 10 which is considerably narrower than the portions 8 and 9. A flange 11 on the sides of each plate constitutes a cleat for the ground-engaging portion 8 and affords strength to the other portions 9 and 10. The wearing edge 9a of the flange is preferably enlarged.

When the two plates are assembled the inclined portions 10 are converging and in consequence the vertical portions 9 are spaced apart to receive the links B. The vertical portions 9—9 of a shoe are formed with two sets of aligned apertures 12 in each of which a bearing 13 is placed and securely held in position by welding 14. A link pin C passing through each set of aligned bearings 13 is held in place against axial movement by means of nuts 15—15, one mounted on each projecting end. The link pins C constitute the principal means of connecting the two plates.

The links B are each formed of a flat strip of metal having its opposite ends bent to form bearings 16. Webs 17—17, one on each side of the link, extend between the bearings perpendicular to the flat strip and are secured by welding. The connection between each of the bearings 16 and a link pin C is made by means of a bushing consisting of a metal tube 18 on whose outer surface a sleeve 19, of a resilient material such as rubber, is secured by vulcanization. The rubber sleeve has a press fit in the bearing 16 of the link. The metal tube 18 is preferably wider than the link bearing 16, and exactly fits between the bearings 13 of the vertical portions 9 and consequently forms a brace for the two parts of the shoe.

The link pin C is formed with a plurality of serrations 20 adapted to fit between corresponding serrations 21 and 22 respectively provided on the inside of the metal tube 18 and the bearings 13. The link pin is thereby held against independent rotational displacement relative to the shoe A and the link B, and consequently any flexing action between the link and shoe must take place through distortion of the rubber sleeve 19. The link pins may be readily inserted and withdrawn and the link or its bushing replaced.

In forming the shoe of two parts the center guide constituted by the inclined portions 10 may easily be provided by bending the plates. In order to obtain a center guide of this height by pressing from one piece it would be necessary to have a piece of considerably greater thickness. The idea of reducing the weight of the shoe is further carried out by not having a continuous ground-engaging surface and by arranging the structure so that the link pins, in bridging the spaced vertical portions 9, supply an added strength and support to the shoe.

A bead 23 is struck up from each of the plates and in addition to strengthening the plate it serves as a cleat for the wheels 24 of the vehicle.

I claim:

1. In a track for track-laying vehicles, a series of spaced shoes, each shoe consisting of two identical plates having spaced vertical portions and converging inclined portions, means for connecting the extremities of the inclined portions, sets of aligned bearings secured to the vertical portions, a link pin passing through each set of aligned bearings, a nut on each end of each link pin, a link having bearings on opposite ends, said link bearings positioned between the vertical portions of adjacent shoes and encircling link pins of said shoes, a bushing interposed between each link pin and link bearing including a metal tube fitting between the bearings of the shoe and slidably receiving the link pin and a rubber sleeve press-fitted in the link bearing, and serrations on the link pin, metal tube and the bearings of the shoe, the serrations on the link pin engaging the serrations on the tube and bearings of the shoe.

2. In a track for track-laying vehicles, a series of spaced shoes, each shoe consisting of two identical plates having spaced vertical portions and converging inclined portions, means for connecting the extremities of the inclined portions, sets of aligned bearings secured to the vertical portions, a link pin passing through each set of aligned bearings, a nut on each end of each link pin, a link having bearings on opposite ends, said link bearings positioned between the vertical portions of adjacent shoes and encircling link pins of said shoes, a bushing interposed between the link pin and link bearing including a metal tube fitting between the bearings of each shoe and slidably receiving the link pin and a rubber sleeve press-fitted in the link bearing, and means for holding the link pin against rotational movement relative to the link and shoe.

3. In a track for track-laying vehicles, a series of spaced shoes, each shoe consisting of two identical plates having spaced vertical portions and converging inclined portions, means for connecting the extremities of the inclined portions, sets of aligned bearings secured to the vertical portions, a link pin passing through each set of aligned bearings, means for securing each pin against removal, a link having on each end a bearing disposed between the vertical portions of a shoe and encircling a link pin, and a bushing in each link bearing including a member fitting between the aligned bearings of the shoe.

4. In a track for track-laying vehicles, a series of spaced shoes, each shoe consisting of two plates having spaced vertical portions and converging inclined portions, means for connecting the extremities of the inclined portions, a pair of link pins passing through the vertical portions of each shoe, means for securing each pin against removal, a link having on each end a bearing disposed between the vertical portions of a shoe and encircling a link pin, and a bushing in each link bearing including a member fitting between and bracing the vertical portions.

5. In a track for track-laying vehicles, a series of spaced shoes, each shoe consisting of two identical plates, each plate having a ground-engaging portion, a vertical portion and an inclined portion, means for connecting the extremities of the inclined portions, a pair of link pins passing through the vertical portions of each shoe, means for securing the pins against removal, and a link connecting the link pins of adjoining shoes.

6. A link for an endless track for track-laying vehicles comprising a flat plate having turned ends forming bearings, webs extending between the bearings on opposite sides of the plate and perpendicular thereto, and means for securing the webs in place.

HARRY A. KNOX.